United States Patent
Kahl et al.

(12)

(10) Patent No.: US 9,896,004 B1
(45) Date of Patent: Feb. 20, 2018

(54) TELESCOPING TAILGATE WITH FOURBAR LINKAGE FOR ELEVATION DROP

(71) Applicant: AISIN TECHNICAL CENTER OF AMERICA, INC., Northville, MI (US)

(72) Inventors: Justin Kahl, Ann Arbor, MI (US); Satoshi Masuda, Novi, MI (US); Ryosuke Mizuno, Aichi (JP); Michael Mixon, Brighton, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/450,560

(22) Filed: Mar. 6, 2017

(51) Int. Cl.
| | |
|---|---|
| *B60N 2/005* | (2006.01) |
| *B62D 33/03* | (2006.01) |
| *B60N 2/30* | (2006.01) |
| *B62D 33/027* | (2006.01) |

(52) U.S. Cl.
CPC ......... *B60N 2/3095* (2013.01); *B60N 2/3002* (2013.01); *B60N 2/309* (2013.01); *B60N 2/3038* (2013.01); *B62D 33/0273* (2013.01); *B62D 33/03* (2013.01)

(58) Field of Classification Search
CPC .. B60N 2/3008; B60N 2/3011; B60N 2/3095; B60N 2/3038; B60N 2/3002; B62D 33/0273
USPC .................... 296/64, 65.01, 66, 67, 50, 57.1
See application file for complete search history.

(56) References Cited

U.S. PATENT DOCUMENTS

| | | | | |
|---|---|---|---|---|
| 5,971,464 A * | 10/1999 | Davis | ............ | B60N 2/3095 296/57.1 |
| 5,975,610 A * | 11/1999 | Tracy | ............ | B60N 2/3095 296/57.1 |
| 6,364,391 B1 * | 4/2002 | Everett | ............ | B60N 2/24 296/51 |
| 6,588,822 B1 * | 7/2003 | Duvall, Jr. | ............ | B60N 2/3011 296/57.1 |
| 7,431,370 B2 * | 10/2008 | Fournier | ............ | B62D 33/0273 296/57.1 |
| 7,513,557 B2 * | 4/2009 | Leigh-Monstevens | | B60N 2/015 296/57.1 |
| 8,123,271 B1 * | 2/2012 | Wimberley | ............ | B60N 2/3095 296/57.1 |
| 8,528,976 B2 * | 9/2013 | Wimberley | ............ | B60N 2/015 24/275 |
| 9,308,947 B2 * | 4/2016 | Kmita | ............ | B60R 9/06 |
| 9,701,225 B1 * | 7/2017 | Hogan | ............ | B60N 2/3095 |
| 2007/0182193 A1 * | 8/2007 | Fournier | ............ | B62D 33/0273 296/57.1 |

(Continued)

FOREIGN PATENT DOCUMENTS

| | | | | |
|---|---|---|---|---|
| JP | 2001-233100 A | 8/2001 | | |
| WO | WO 2005014330 A3 * | 6/2006 | ............ | B60N 2/3011 |

*Primary Examiner* — Dennis H Pedder
(74) *Attorney, Agent, or Firm* — Oblon, McClelland, Maier & Neustadt, L.L.P.

(57) ABSTRACT

A tailgate of a vehicle including a back portion and a seat portion, a telescopic mechanism including a first link, a second link, and a slotted link with a slot connected to the back portion of the tailgate allowing the tailgate to slide and pivot, and a four-bar mechanism including a third link and a fourth link hingedly connected to the back portion and the seat portion of the tailgate, wherein the telescopic mechanism and the four-bar mechanism allow the tailgate to transition between a first position, a second position, and a third position.

10 Claims, 4 Drawing Sheets

(56) References Cited

U.S. PATENT DOCUMENTS

2008/0246298 A1* 10/2008 Leigh-Monstevens B60N 2/015
296/64
2015/0102624 A1* 4/2015 Kmita .................... B60R 9/06
296/37.6

* cited by examiner

TELESCOPING TAILGATE WITH FOURBAR LINKAGE FOR ELEVATION DROP

BACKGROUND

Field of the Disclosure

This disclosure relates generally to a tailgate of a vehicle. More particularly the present disclosure relates to transforming the tailgate of the vehicle into a seating arrangement with a seat portion dropping below a level of the tailgate.

Description of the Related Art

Conventionally, a tailgate is attached to a box of a vehicle such as a pickup truck or a sport utility vehicle. The tailgate is hinged to a bed of the truck along the width of the bed. The tailgate can be latched to the box to secure contents in the box and unlatched for loading or unloading the contents of the box. Another use of tailgate can be for seating purposes. Typically, during tailgating, the tailgate is placed in an open configuration providing the gathered individuals with a place to sit.

A tailgate can include attachments to attach and detach a seating device. For example, a bench seat that comprises a seat and a back rest can be mounted to a tailgate and designed for easy removal from the tailgate.

A tailgate can also be collapsed into a seat bench, for example, in U.S. Pat. No. 8,123,271 B1. A seat portion of the tailgate is connected by cables to a back portion and the seat is maintained at the same level as the bed of the vehicle. When the bed is higher from the ground, it may be uncomfortable to sit on the tailgate; as such a lowered seat portion may be desired. Hence, there remains a continuing need to provide improved multipurpose tailgate for vehicles. For example, the tailgate intended to make the seating experience more enjoyable by providing a user with a more comfortable place to sit at a lower level than the bed of a tuck.

SUMMARY

According to an embodiment of the present disclosure, there is provided a tailgate apparatus of a vehicle. The apparatus includes a back portion and a seat portion, a telescopic mechanism including a first link, a second link, and a slotted link with a slot connected to the back portion of the tailgate allowing the tailgate to slide and pivot, and a four-bar mechanism including a third link and a fourth link hingedly connected to the back portion and the seat portion of the tailgate, wherein the telescopic mechanism and the four-bar mechanism allow the tailgate to transition between a first position, a second position, and a third position.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It must be noted that, terms such as "length," "width," "lower," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
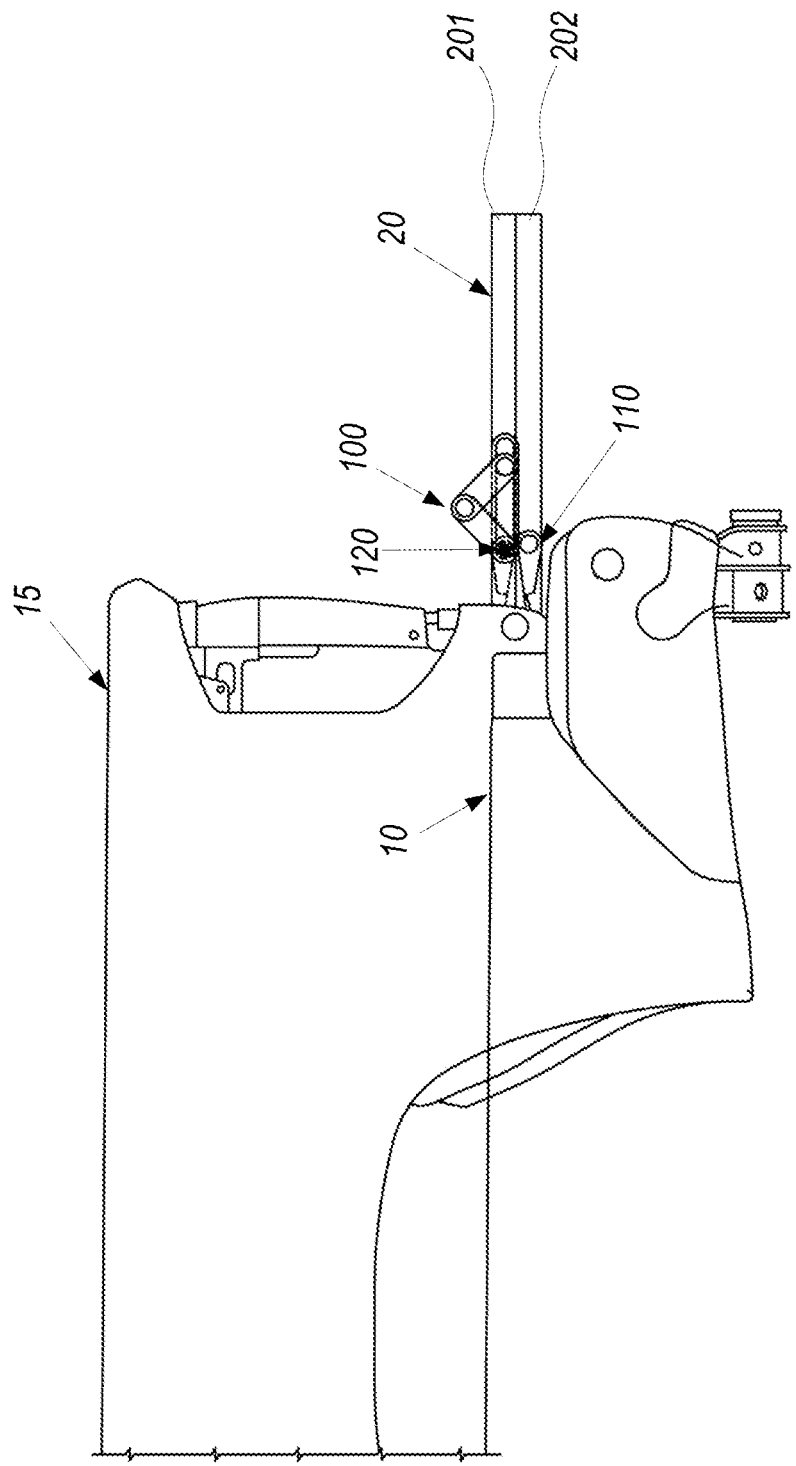
FIG. 1 illustrates a tailgate in a first position according to an aspect of the present disclosure.

FIG. 1 illustrates a first position of a tailgate 20 according to an aspect of the present disclosure. The tailgate 20 can be flap or door connected to a bed 10 that can be locked and unlocked to a cargo box 15 of a vehicle. The tailgate 20 is divided into a back portion 201 and a seat portion 202. The back portion 201 of the tailgate 20 is connected to a telescopic mechanism 100 and the seat portion 202 of the tailgate 20 is connected to a four-bar mechanism 110.

Normally, the telescopic mechanism 100 and the four-bar mechanism 110 remain in a locked state. The mechanisms 100 and 110 are sequentially unlocked when converting the tailgate 20 to a seating arrangement.

The telescopic mechanism 100 allows the tailgate 20 to slide away from the bed 10, while the four-bar mechanism 110 allows the tailgate 20 to be converted into a seat. Further, the telescopic mechanism 100 in conjunction with the four-bar mechanism 110 enables the tailgate 20 to be lowered below the bed 10 of the vehicle. The tailgate 20 can be transformed into a seating arrangement via the telescoping mechanism 100 and the four-bar mechanism 110 in three steps.

In the first step, the tailgate 20 occupies the first position, shown in FIG. 1. The first position is a horizontal position of the tailgate 20 that is reached by unlocking the tailgate 20 from the box 15 and pivoting the tailgate 20 about the bed 10 in a downwards direction. In the first position, the telescopic mechanism 100 is unlocked that allows the tailgate 20 to slide away from the bed 10 in the horizontal position. In the first position, the back portion 201 and the seat portion 202 of the tailgate 20 are in closed state or folded state and remain horizontal. The back portion 201 and the seat portion 202 are in line with the bed 10 of the vehicle.

Figure 2:
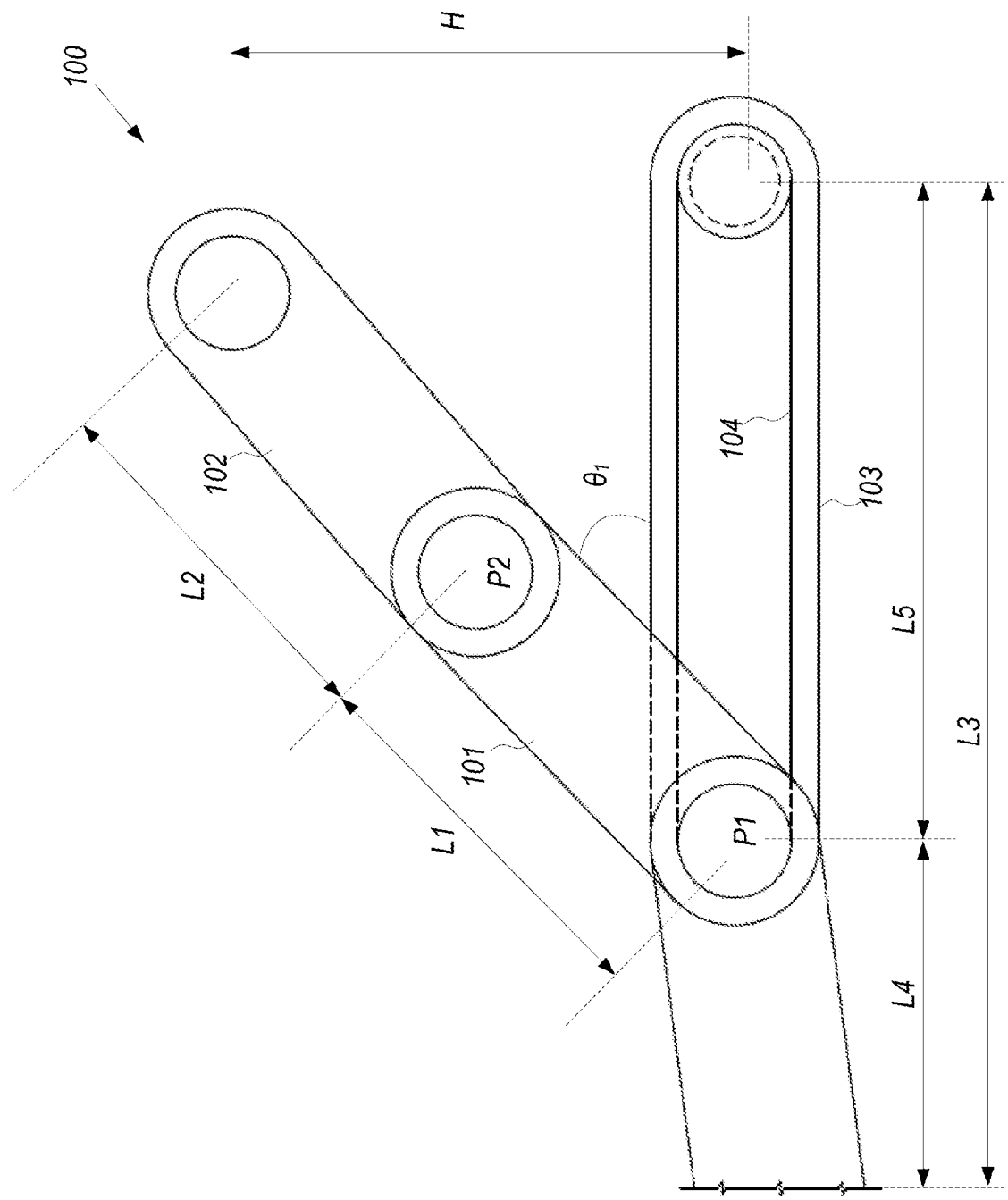
FIG. 2 illustrates a telescoping mechanism of the tailgate according to an aspect of the present disclosure.

FIG. 2 illustrates a telescoping mechanism 100 according to an aspect of the present disclosure. The telescoping mechanism 100 includes a first link 101, a second link 102, and a slotted link 103. A first end of first link 101 is hinged to the slotted link 103 at a first pivot point P1. A second end of the first link 101 is hinged to a first end of the second link 102 allowing the links 101 and 102 to rotate relative to each other about a second pivot point P2.

The length of the first link 101 is L1, the length of the second link 102 is L2, and the length of the slotted link 103 is L3. The slotted link 103 includes a slot 104 of length L5. The first pivot point P1 is located at a distance L4 from a bed end i.e., an end connected to the truck bed) of the slotted link 103. The first link 101 and the second link 102 can be fully extended. Furthermore, the first link 101 can form an angle $\theta_1$ with the slotted link 103 creating a distance H mm between the ends of the slotted link 103 and the second link 102. The angle $\theta_1$ between the links 101 and 103 and the distance H between the links 102 and 103 allows the telescopic mechanism 100 to provide a support to the back portion 201 (not shown in FIG. 2) of the tailgate 20 when in a second position (as illustrated in FIG. 3).

Figure 3:
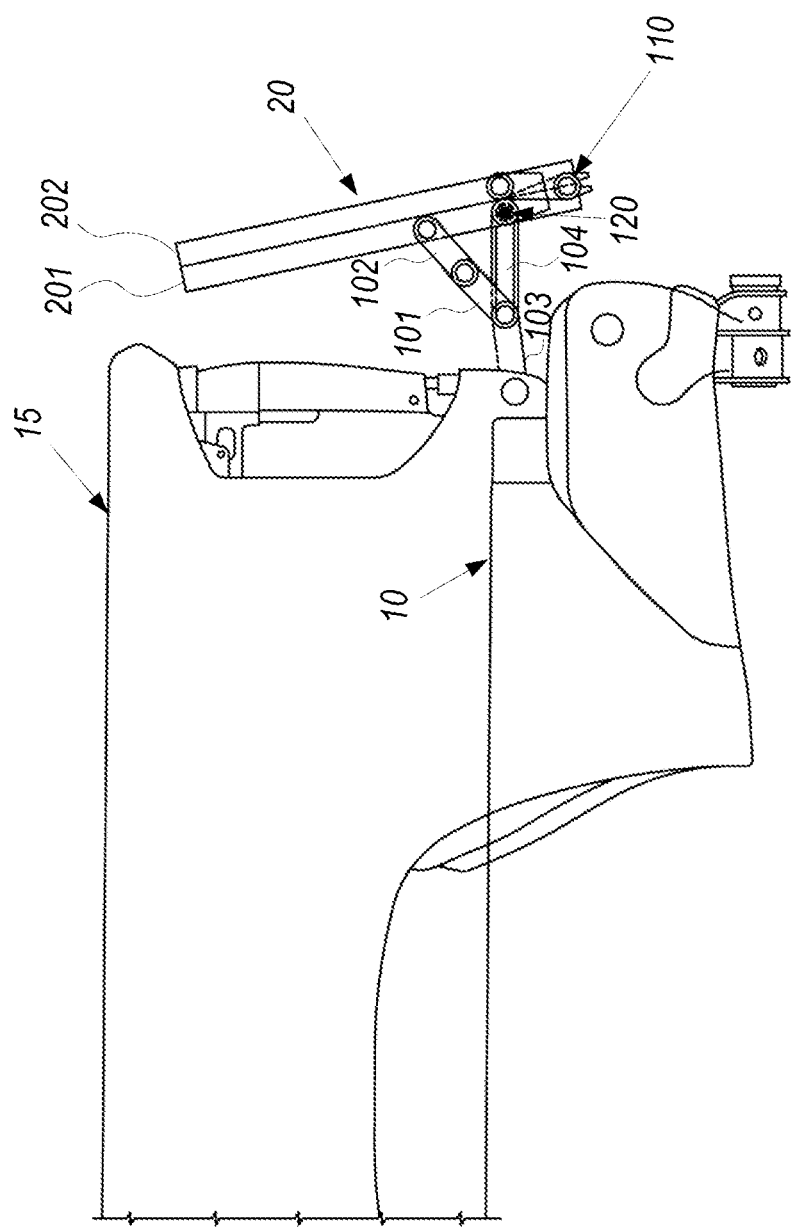
FIG. 3 illustrates a second position of the tailgate according to an aspect of the present disclosure.

Referring to FIG. 3, the telescopic mechanism 100 is hingedly connected to the bed 10 and the tailgate 20. A second end of the second link 102 is hingedly connected to the tailgate 20 at a first location and a first end of the slotted link 103 is hingedly connected to the bed 10 of the vehicle. Furthermore, the slotted link 103 is connected to the tailgate 20 via a trigger 120 at a second location such that the trigger 120 can slide along the slot 104 and the tailgate 20 can pivot about a trigger 120. Thus, the tailgate 120 can slide along the slot 104 at the second location and pivot about the first location.

The trigger 120 is a device (e.g., a cylindrical pin) used to release a spring to unlock the four-bar mechanism 110. The sliding of the tailgate 20, as discussed earlier with respect to FIG. 1, causes the trigger 120 to slide along the slot 104 of the slotted link 103 of the telescoping mechanism 100 and unlock the four-bar mechanism 110. Also, the tailgate 20 can be rotated to a second position as illustrated in FIG. 3.

Figure 4:
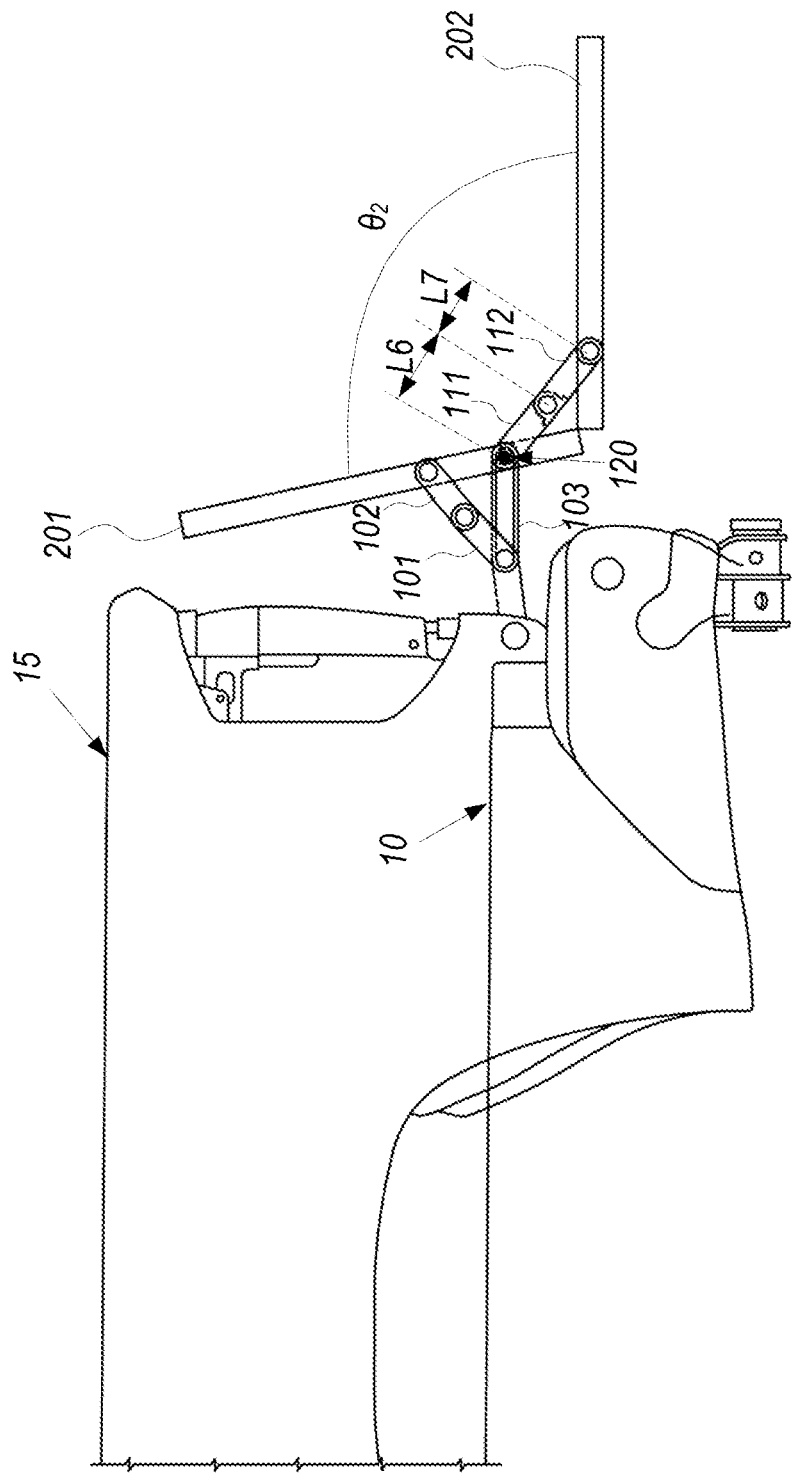
FIG. 4 illustrates a third position of the tailgate according to an aspect of the present disclosure.

The second position of the tailgate 20 can reached from the first position (in FIG. 1) or from the third position (in FIG. 4). From the first position, the back portion 201 and the seat portion 202 are rotated together in upward direction at an angle $\theta_3$ with respect to the bed 10 of the vehicle to occupy the second position. The angle $\theta_3$ can be greater than or equal to 90° to allow a user to comfortably rest his/her back against the back portion 201.

In the second position, the back portion 201 and the seat portion 202 of the tailgate 20 are folded together and inclined at the angle $\theta_3$ with respect to the slotted link 103. The first link 101 and the second link 102 are in fully extended position. The trigger 120 is positioned at the second end of the slotted link 103 which unlocks the four-bar mechanism 110. As the four-bar mechanism 110 is unlocked, it allows the tailgate 20 to transition to the third position.

FIG. 4 illustrates the third position of the tailgate 20 according to an aspect of the present disclosure. The third position can be reached from the second position by rotating the seat portion 202 downwards and separating the seat portion 202 from the back portion 201. Further, the seat portion 202 drops below the level of the bed 10. From the third position, the seat portion 202 can be moved back into the second position by rotating the seat portion 202 upwards (i.e., towards the back portion 201). Alternatively or in addition, the back portion 201 and the seat portion 202 can be rotated simultaneously towards each other to occupy the first position from the third position.

In the third position, the seat portion 202 of the tailgate 20 is opened or unfolded and the four-bar mechanism 110 is fully extended. The four-bar mechanism 110 causes the seat portion 202 of the tailgate 20 to drop below a reference level such as a level of the bed 10. The seat portion 202 does not touch the ground.

The four-bar mechanism includes the back portion 201, the seat portion 202, a third link 111, and a fourth link 112 that are hingedly connected to each other. The third link 111 can be of length L6 and the fourth link 112 can be of length L7. In the fully extended position, the third link 111 is approximately at 180° to the fourth link 112. Depending on the lengths of the four-bar mechanism, the seat portion 202 can form an angle $\theta_2$ ranging from 60°-90° with respect to the back portion 201 of the tailgate 20.

The four-bar mechanism 110 can also include a spring connected at the hinge between the back portion 201 and the seat portion 202. The spring allows the four-bar mechanism to be maintained in a locked position or an unlocked position. In the locked position, the back portion 201 and the seat portion 202 of the tailgate 20 are folded together, while in the unlocked position, the seat portion 202 can be unfolded to create the seating arrangement as shown in FIG. 4.

While certain embodiments have been described, these embodiments have been presented by way of example only, and are not intended to limit the scope of the present disclosures. Indeed, the novel apparatus described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A tailgate of a vehicle comprising:
   a back portion;
   a seat portion;
   a telescopic mechanism including a first link, a second link, and a slotted link with a slot connected to the back portion of the tailgate allowing the tailgate to slide and pivot; and
   a four-bar mechanism including a third link and a fourth link hingedly connected to the back portion and the seat portion of the tailgate, respectively, wherein the telescopic mechanism and the four-bar mechanism allow the tailgate to transition between a first position, a second position, and a third position.

2. The tailgate according to claim 1, further comprising a trigger connected to the back portion of the tailgate and slidably connected in the slot of the slotted link.

3. The tailgate according to claim 1, wherein a first end of the first link is hingedly connected to a first end of the slotted link and the second end of the first link is hingedly connected to a first end of the second link.

4. The tailgate according to claim 1, wherein the back portion of the tailgate is connected to a second end of the second link at a first location.

5. The tailgate according to claim 4, wherein the back portion of the tailgate is slidably connected in the slot of the slotted link at a second location different the first location.

6. The tailgate according to claim 5, wherein the tailgate slides relative to the slot from the first end of the slotted link to the second end of the slotted link while pivoting the first link and the second link in a fully extended state to occupy the third position.

7. The tailgate according to claim 5, wherein the tailgate pivots about the first location to transition from the first position to the second position.

8. The tailgate according to claim 6, wherein the seat portion of the tailgate pivots about the back portion of the tailgate pivoting the third link and the fourth link of the four-bar mechanism in a fully extended state to occupy the third position.

9. The tailgate according to claim 8, wherein, in the third position, the seat portion of the tailgate is below a height of a bed of the vehicle.

10. The tailgate according to claim 8, wherein the tailgate moves in a sequential manner from the first position to the second position and to the third position.

* * * * *